US009465597B2

(12) United States Patent
Thorsen et al.

(10) Patent No.: US 9,465,597 B2
(45) Date of Patent: Oct. 11, 2016

(54) SYSTEM FOR OPERATING A DEVICE AS A STORAGE DEVICE AND A MODEM DEVICE

(71) Applicant: Nvidia Corporation, Santa Clara, CA (US)

(72) Inventors: Tom Thorsen, Bristol (GB); Ian Reid, Bristol (GB)

(73) Assignee: Nvidia Corporation, Santa Clara, CA (US)

(*) Notice: Subject to any disclaimer, the term of this patent is extended or adjusted under 35 U.S.C. 154(b) by 81 days.

(21) Appl. No.: 13/719,555

(22) Filed: Dec. 19, 2012

(65) Prior Publication Data
US 2014/0040881 A1 Feb. 6, 2014

(30) Foreign Application Priority Data
Aug. 6, 2012 (GB) .................. 1213957.2

(51) Int. Cl.
G06F 9/445 (2006.01)
G06F 9/44 (2006.01)

(52) U.S. Cl.
CPC ............... G06F 8/61 (2013.01); G06F 9/4411 (2013.01)

(58) Field of Classification Search
None
See application file for complete search history.

(56) References Cited

U.S. PATENT DOCUMENTS

2004/0230710 A1 11/2004 Goodman
2008/0002760 A1* 1/2008 Nasielski et al. ............. 375/222
2008/0127225 A1* 5/2008 Mullis et al. ................. 719/321
2009/0193154 A1* 7/2009 Gotze et al. ................... 710/14
2010/0296654 A1 11/2010 Wilson et al.

FOREIGN PATENT DOCUMENTS

WO 2008136816 A1 11/2008

OTHER PUBLICATIONS

Crenshaw, Adrian. "Plug and prey: Malicious USB devices." URL: http://www.irongeek com/downloads/ Malicious%20020USB%20Devices.pdf, 2011, Retrieved Jun. 9, 2016.*
Ali, Asad M. "Seamless Fusion of Secure Software and Trusted USB Token for Protecting Enterprise & Government Data." Availability, Reliability and Security (ARES), 2011 Sixth International Conference on. IEEE, 2011. Retreived Jun. 9, 2016.*
Combined Search and Examination Report dated Dec. 12, 2012, Application No. GB1213957.2, 11 pages.

* cited by examiner

Primary Examiner — Chameli Das
Assistant Examiner — Joanne Macasiano

(57) ABSTRACT

A device is disclosed herein. In one embodiment; the device includes: a wireless transceiver; an interface for connecting with a terminal running one of the first and second operating systems; memory storing the driver software for installation on the terminal if running the second operating system; and processing apparatus operable to output a first definition of a configuration of the device and a second definition of a configuration of the device; wherein the first definition defines configuration of the device as a storage device for providing the driver software to the terminal; and on condition that the terminal is running the first version of the first operating system, the second definition defines configuration of the device as a modem.

18 Claims, 2 Drawing Sheets

SYSTEM FOR OPERATING A DEVICE AS A STORAGE DEVICE AND A MODEM DEVICE

CROSS REFERENCES TO RELATED APPLICATION

This application claims priority from GB Application No. GB1213957.2 filed on Aug. 6, 2012, entitled "MODEM INSTALLATION," by Tom Thorsen, et al. The above application is commonly assigned with this application and is incorporated herein by reference in its entirety.

TECHNICAL FIELD

The disclosure concerns detecting whether to install modem driver software when connecting a wireless modem device to a host terminal, or whether to use intrinsic software of the host terminal's operating system.

BACKGROUND

A host terminal such as a desktop or laptop computer often makes use of a wireless modem device, e.g. in the form of an external dongle connecting to the host terminal via a USB (universal serial bus) port. The host terminal runs operating system (OS) software which will operate the device as a modem to make calls or provide wireless Internet access via a mobile cellular network (e.g. a 3GPP network or other CDMA network).

Some operating systems or some legacy versions of operating systems do not contain enough software to drive a wireless modem by themselves. Typically, in this case the user must install some software before the modem can function. To do this, most devices on the market have a two stage process. The first stage is that the modem emulates a CD-ROM device which contains the required software. Once the software is installed, the modem is reset to provide modem functionality. On the other hand, a more modern version of the operating system may comprise sufficient software to operate the wireless modem without additional driver software needing to be installed. It is desirable to provide a suitable mechanism for detecting, upon the device being connected, whether or not the operating system can immediately use the device as a modem or whether it requires the additional driver software.

SUMMARY

According to one aspect of the disclosure, there is provided a device for use with at least a first version of a first operating system. In one embodiment, the device includes: intrinsic software for operating the device as a wireless modem, and at least one second operating system that requires installation of driver software to operate the device as a wireless modem; the device comprising: a wireless transceiver; an interface for connecting with a terminal running one of the first and second operating systems; memory storing the driver software for installation on the terminal if running the second operating system; and processing apparatus operable to output a first definition of a configuration of the device and a second definition of a configuration of the device; wherein the first definition defines configuration of the device being as a storage device for providing the driver software to the terminal; and on condition that the terminal is running the first version of the first operating system, the second definition defines configuration of the device as a modem.

BRIEF DESCRIPTION OF THE DRAWINGS

For a better understanding of the disclosure and to show how it may be put into effect, reference is made by way of example to the accompanying drawings in which.

DETAILED DESCRIPTION

Figure 1:
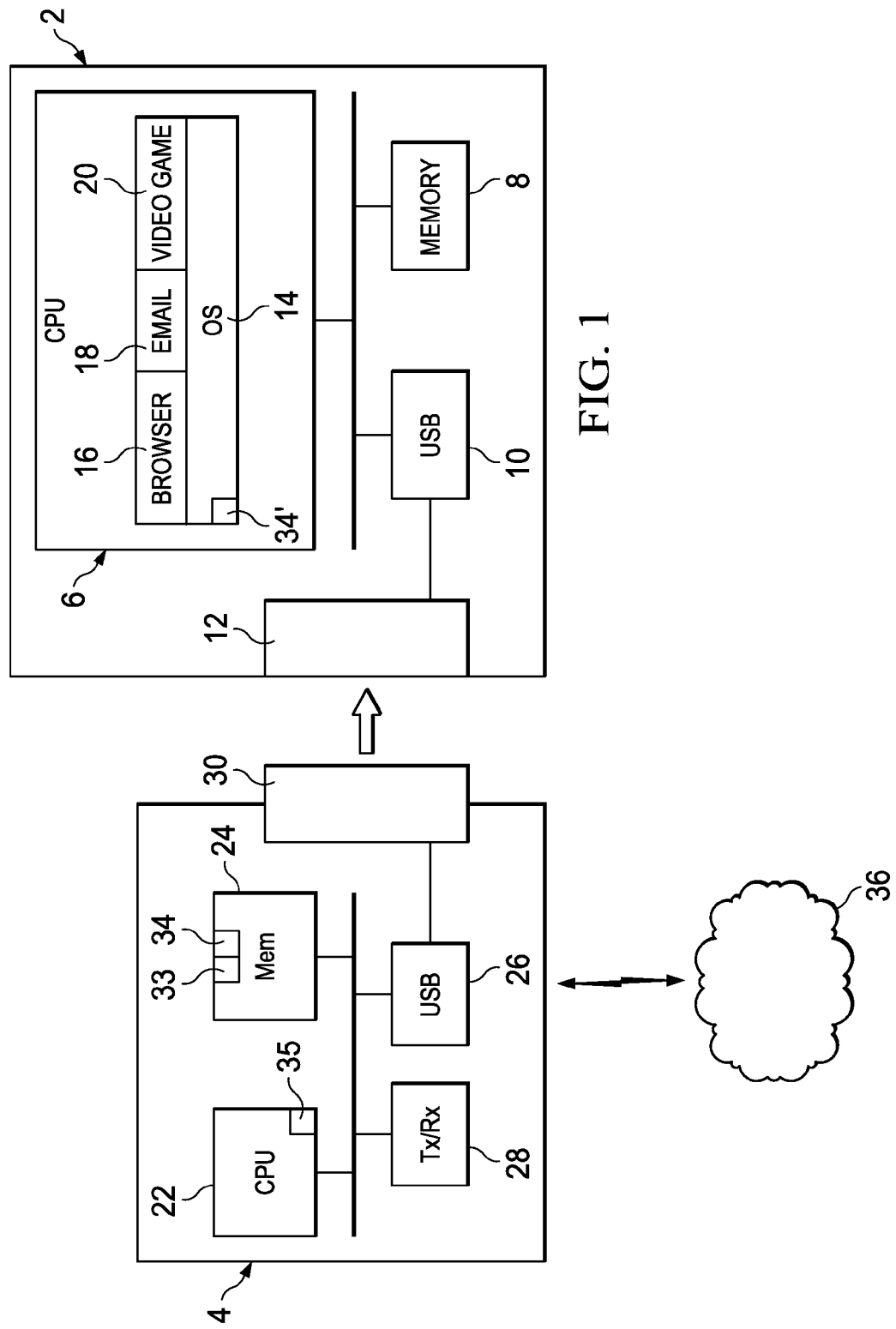
FIG. 1 is a schematic block diagram of a computer system.

As mentioned, some operating systems or some legacy versions of operating systems do not contain enough software to drive a wireless modem by themselves. As such, the user installs some software before the modem can function. First the modem emulates a storage device which contains the required software. Once the software is installed, the modem is reset to provide modem functionality, which the operating system can then support with the help of the extra driver software. The next time the modem is inserted, this extra software switches the modem into mission mode.

These two personalities may be referred to as mass storage mode (acts like a storage device such as a CD-ROM) and modem mode (can make calls). Even though most devices in the industry work in this way, the method of switching between these modes may be proprietary to each vendor.

In contrast, provided that the modem device implements certain requirements, at least one more modern version of an operating system may have enough in-built support to operate the modem without any extra driver software needing to be installed. For example this could be the current version of an operating system of a particular software developer—call this version A1 of operating system A. However, for compatibility with different operating systems, or legacy versions of the operating system, the modem device still also implements mass storage mode to allow driver software to be installed.

To allow the modem device to indicate whether it supports operation using the in-built modem software of the modern operating system A1, the developer of operating system A may define a mechanism of OS descriptors that allow a device to advertise such extra functionalities.

At least one or more legacy versions of the operating system A by the same developer—call these version(s) A2—will support this mechanism. The operating system A specifies a capability for the modem to advertise the required modem functionality capability—i.e. the capability to operate based on the in-built modem software of operating system A1. On legacy versions A2, the operating system will see this capability but ignore it, and instead install and use the driver software in the more traditional fashion. On the more modern version A1 of the operating system A, the operating system will see that capability and request it so that the modem can be operated directly by the in-built modem software of operating system A1.

At a lower level, the device has to have two USB configurations. The first (config 1) is mass storage, the second (config 2) is modem mode. Legacy operating systems A2 will choose config 1, whereas the modern operating system A1 will choose config 2, based on the query described above. This whole mechanism may be referred to as "identity morphing".

The possible flows are as follows.

For a terminal running a legacy version A2 of operating system A: the OS queries the device's standard USB descriptors AND the extra queries→it chooses config 1 (as it doesn't support the functionality we advertise)→the device arrives as a mass storage device→modem driver software is installed on the PC→device is told to switch to modem mode by the driver software→device is functional.

For a terminal running a more modern version A1 of the operating system A: the OS queries the device's standard USB descriptors AND the extra queries→it chooses config 2 (as the descriptor is there)→the device arrives as a modem supporting operating based on A1's in-built software→device is functional However, there is a potential problem if the modem is connected to a terminal running another operating system B, e.g. from a different software developer.

For a terminal running operating system B (before any fix): the OS queries the device's standard USB descriptors→it chooses config 2 (it reads Config 2 as a CDC-class device, which it has some support for)→the device arrives as a modem to be operated by in-built modem software of operating system A1→device is NOT functional The CDC (communications device class) driver of operating system B recognizes that there is a CDC-class device (the descriptor used by operating system A to advertise its modem capability may be part of the USB CDC class of devices).

However, the CDC driver does not implement operating system A's proprietary part of the specification which defines the special descriptor(s) that are specific to operating system A. This leaves the descriptor of operating system A1's functionality exposed to operating system B, but without a functioning driver for it. That is, the operating system B sees that the second configuration (as a modem or CDC device instead of a storage device) is available and tries to select this configuration. However, it is unable to actually use this configuration because it does not have the necessary in-built software. The situation may arise because the operating system B does not understand the special descriptor defining the modem configuration as being one that needs the built-in driver software, because this descriptor is proprietary to operating system A or at least not supported by B.

A potential difficulty is that it would be desirable to advertise different functionality based on which operating system the modem device is connected to. The two configurations are to be advertised very early on in the USB enumeration process, and once this has been done, the USB specification does not allow this number to be reduced.

Embodiments of the disclosure change the content of those configurations. Config 1 is always advertised as mass storage. If the extra queries are made, then Config 2 is advertised as supporting the in-build modem software of operating system A1. If it isn't, then Config 2 becomes mass storage (identical to config 1).

So for operating system B (after the fix) the flow is: the OS queries the device's standard USB descriptors→it chooses config 1 (as it is the same as config 2)→the device arrives as a mass storage device→modem driver software is installed on the host terminal→the device is told to switch to modem mode by the driver software→device is functional The improvement is that when a modem that supports identity morphing is plugged in to an operating system B machine, a non-functioning modem device is not enumerated.

As noted above, a device is disclosed. According to another aspect of the disclosure, there is provided a computer program product. In one embodiment, the computer program product is embodied on a storage module and arranged so as when executed on a modem device to perform operations in accordance with any of the features of the above device.

According to another aspect of the disclosure, there is provided a method. In one embodiment, the method includes performing operations corresponding to any of the above device features.

Regarding the device, in one embodiment the device includes a processing apparatus. In embodiments the processing apparatus may be configured to output the definitions in response to a query from the operating system running on the terminal.

In embodiments. on condition that the terminal is running the second operating system, the second definition may instead also define configuration of the device as a storage device for providing the driver software to the terminal.

In embodiments, the second definition may comprise an indication that the device supports operation by the intrinsic software of the first version of the first operating system.

In embodiments, the processing apparatus may be configured to determine said condition in dependence on whether it receives a query for said indication from the terminal.

In embodiments, if no query for said indication is received, the second definition may instead also define configuration of the device as a storage device for providing the driver software for installation on the terminal.

In embodiments, the device may also be for use with a second version of the first operating system, the second version requiring installation of driver software to operate the device as a wireless modem, and the memory storing driver software for installation on the terminal if running the second version of the first operating system.

In embodiments, the first operating system may be of a first software developer, and the second operating system may be of a second software developer.

In embodiments, said indication may be of a proprietary protocol of the first software developer not recognised by the second operating system.

In embodiments, the processing apparatus may be configured according to a specification which requires it to output the number of configurations available if requested by the operating system running on the terminal, such that if requested by the second operating system the device must indicate availability of the second configuration to the second operating system.

In embodiments, if the operating system running on the terminal is the second version of the first operating system the device may operate according to the first configuration.

In embodiments, the wireless transceiver may comprise a cellular transceiver, the device thereby enabling the terminal to communicate over a mobile cellular network when operated as a modem.

In embodiments, the mobile cellular network may comprise a 3GPP network and/or CDMA network.

In embodiments, the device may enable the terminal to perform one or both of calls and packet-based communications over the mobile cellular network when operated as a modem.

In embodiments, the device may enable the terminal to access the Internet, virtual private network or other remote network via the mobile cellular network when operated as a modem.

In embodiments, the device may take the form of an external device for plugging in to the terminal.

In embodiments, the interface may comprise a USB connector or PCIe minicard connector.

In embodiments, the terminal to which the interface is arranged to connect may comprise a desktop or laptop computer.

Embodiments of the disclosure will now be described in more detail with reference to FIGS. 1 and 2.

FIG. 1 gives a schematic block diagram of a computer system comprising a modem device 4 and a host terminal 2 (i.e. the terminal to which the modem device 4 is to be connected). The host terminal 2 may take the form of a desktop or laptop computer, or other user terminal. The modem device 4 may take the form of an external device (external to the host terminal 2, in a separate housing) such as a dongle. Alternatively the modem 4 could take the form of a data card to be installed within the housing of the host terminal 2, e.g. via a PCIe minicard connector. When connected, the modem 4 provides the terminal 2 with access to wireless communications, such access to a mobile cellular network to make calls and/or access to the Internet via a wireless medium such as via the mobile cellular network, or to access a virtual private network or other remote network. Such networks are illustrated schematically in FIG. 1 by communications cloud 36.

The host terminal 2 comprises a processor 6, memory 8 and interface module 10 coupled together by a suitable internal interconnect. The interface module 10 is coupled to a suitable connector for connecting to the modem device 4, e.g. the interface system 10 may comprise a USB interface module coupled to a USB connector 12. The memory 8 stores an operating system 14 and a plurality of applications 16, 18, 20 arranged to execution on the processor 6. The operating system 14 controls the execution of the applications 16, 18, 20 on the processor including by providing them with access to the wireless communications via the modem device 4, e.g. to provide them with wireless Internet access or to make calls. The operating system 14 may comprise any of a first (e.g. more modern) version A1 of a first operating system A, a second (e.g. legacy) version A2 of the first operating system A, and at least one second operating system B. The first operating A system may be the product of a first software developer and the second operating system B may be the product of a second software developer based on different technology than that of the first developer. For example the first version A1 of the first operating system may be Windows 8®, the second version A2 of the first operating system may be any of Windows XP, Windows Vista or Windows 7®, and the second operating system B may be Apple OS X®.

In the case of the first version A1 of the first operating system, this comprises intrinsic software 34' for operating the wireless modem device 4 as a wireless modem (and thereby provide the applications 16,18,20 with access to the wireless communications), without needing extra driver software to be installed on the host terminal 2. However, in the case of the second version A2 of the first operating system and the second operating system B, these operating systems do require driver software to be separately installed onto the memory 8 of the terminal 2 in order to operate the modem device 4 as a wireless modem (and provide the applications 16,18,20 with access to the wireless communications that way).

The modem device 4 comprises a processor 22, memory 24, wireless transceiver 28 and interface module 26 coupled together by a suitable internal interconnect. The interface module 26 is coupled to a connector 30 for connecting to the host terminal 2, e.g. the interface module 26 may comprise a USB interface module for connecting to the host 2 via a USB connector 30. The wireless transceiver 28 provides the access to the wireless communications (e.g. as described above) when the device 4 is operated as a modem. The memory 24 stores driver software 34 arranged to be supplied for installation on the memory 8 of the host terminal 2, for execution on the host 2. When thus installed on the host 2, the driver software 34 from the device 4 enables the second operating system B, or the second version A2 of the first operating system, to drive the wireless modem 4 so as to enable the above-mentioned wireless communications.

The memory 24 also stores software 33 configured to complement the intrinsic modem software 34' of the first version A1 of the first operating system, so that when the complementary software 33 runs on the processor 22 of the modem device 4 and the intrinsic modem software 34' runs on the processor 6 of the host terminal 2, then the modem device 4 is operated as a wireless modem to provide the applications 16,8,20 with access to the wireless communications.

Further, the memory 24 of the modem device 4 comprises interfacing code 35 arranged to execute on the local processor 22 of the modem device 4. When thus executed, the interfacing code 35 performs operations in accordance with the relevant interface specification, e.g. the USB specification. This includes providing, when queried by the host OS, a definition of the available configurations of the device 4—which will at least comprise a configuration as a storage device for providing the driver software 34 for installation on the host terminal 2 if running the second operating system B or the second version A2 of the first operating system (config 1), and a configuration as a modem for operating under the built-in modem software 34' of the first version A1 of the first operating system (config 2). The interfacing code 35 is configured to provide an indication of the availability of the different configurations, and a definition of the configurations, if queried for such by the operating system 14 running on the host terminal 2.

The interfacing code 35 is also configured to provide, if queried by one of the first operating systems A, an indication that the modem device 4 comprises the complementary code 33 and therefore supports operation under intrinsic modem software 34' of the first version A1 of the first operating system. This indication may be recognisable to the first version A1 of the first operating system and to the second version A2 of the first operating system, but not to the second operating system B.

The interface software 25 may comprise one or more suitable APIs (application programming interfaces) to implement the relevant functionality. In one embodiment for example the interfacing code 35 is configured in accordance with the Mobile Broadband Interface Model (MBIM), and the indication that the device 4 supports the extra functionality 33, 34' takes the form of an MBIM descriptor.

The definition of the configurations config 1 and config 2 may also comprise one or more additional descriptors in accordance with USB specifications. For example, these may define whether the configuration is as a storage device or a modem, and whether the configuration is of the CDC class.

The combination of the above may cause a problem in that the second operating system B may query and recognise the non-proprietary USB descriptors defining the second configuration as a modem and/or as a CDC class configuration, but may not recognise the proprietary MBIM descriptor or the like (and not even query the device 4 for such a descriptor). The result will be that the second operating system may attempt to select the second configuration, preferring to select a modem or CDC device, but then be unable to operate the device 4 as modem because it was not aware that it would need the intrinsic modem software 34' (which it does not have).

In accordance with embodiments, the interfacing code 35 is configured so as to make the second configuration conditional on whether the terminal 2 is running one of the first operating systems A or the second operating system B. This is detected in dependence on whether the interfacing code 35 running on the receives from the operating system 14 a query for the descriptor that defines whether the modem device 4 comprises the relevant code 33 to support operation under built-in modem software 34' of the first operating system A. If it does not receive such a query, it knows the operating system does not understand the relevant protocol and is therefore not of the first type A. To avoid the above difficulties, the interfacing code 35 on the modem device 4 therefore does not allow the operating system B the option of a modem configuration.

In the USB specification the modem 4 may be obliged to declare up-front how many configurations it has available, in response to an initial query from the operating system, before it receives (or detects the absence of) any further queries that would allow it to detect whether the operating system is one the first operating systems A or is another operating system B. According to the USB specification it may not be allowed to subsequently withdraw any of the declared number of configurations, Therefore in embodiments, if the interface code 35 determines that it needs to withhold the modem configuration from the operating system B, it instead achieves this by making both config 1 and config 2 defined as identical storage device configurations so that it makes no difference which the operating system B chooses. However, in alternative embodiments (e.g. operating under different specifications or a future version of a USB specification) it is also possible that the interfacing code 35 on the modem device 4 could instead withhold or withdraw one of the configurations, e.g. so the operating system B is only provided with one configuration option config 1.

Figure 2:
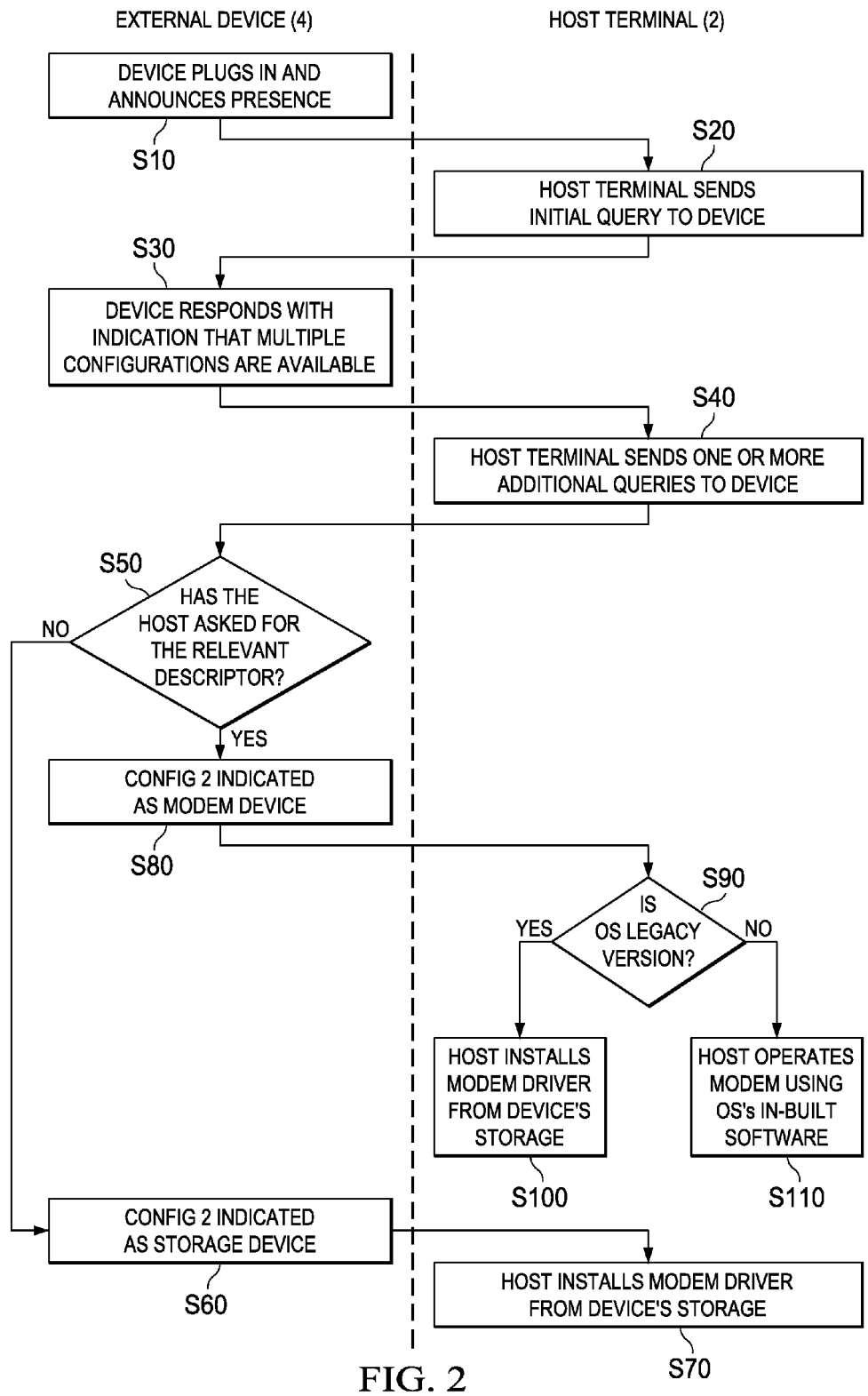
FIG. 2 is a flow chart of a method for detecting whether to install modem driver software.

An interaction between the interfacing software 35 on the modem 4 and the operating system 14 on the host terminal 2, occurring via the USB connection 10,12,26,30 or the like, is now described in relation to the flow chart of FIG. 2.

At step S10 the modem device 4 is plugged into the host terminal 2 and sends a signal to the host terminal 2 announcing its presence on the USB connection. At step S20 the host terminal 2 detects the announcement and in response sends an initial query to the modem device 4 requesting that the modem device 4 provides initial information about itself to the host 2. At step S30 the modem device 4 responds to the host 2 with the initial information. This may comprise an indication of the number of available configurations (e.g. two, config 1 and config 2), a location of field of a data structure in the device's memory 24 where the descriptors defining the configurations can be found by the host 2, as well as other information such as location of a field of the data structure where the host can find the device's name or it's manufacturer's name. The process of declaring the number of USB configurations may be referred to as enumeration.

At step S40, the host 2 uses the initial information to send one or more additional queries to the modem device 4. These may comprise a request for the definition of one or more of the configurations, including at least config 2. For example the one or more additional queries may comprise a query as to the type of each configuration (storage device or modem device), or the class (e.g. is it CDC class). If the operating system 14 is one of the first operating systems A, either the first version A1 or second version A2, it knows to also query for the descriptor defining whether the device 4 supports operation under intrinsic modem software 34' of the operating system, e.g. in accordance with the first developer's proprietary protocol. For example this could be an MBIM descriptor. However, the second operating system B will not ask for that particular descriptor, e.g. as it does not necessarily use the first developer's proprietary protocol.

At step S50 the modem device 4 determines which type of operating system it is dealing with, A or B, by determining whether it received a request for the MBIM descriptor (or the like). If not such request was received, the operating system 14 is of type B that does not support the relevant protocol and so there is a danger it will select config 2 but not be able to operate it (seeing config 2 as a modem or CDC configuration generally but not seeing the necessary information specific to the functionality 34' of the first version A1 of first operating system). To avoid this therefore, at step S60 the modem 4 responds with one or more descriptors defining that config 2 is another configuration as a storage device (as it also does for config 1). Therefore at step S70, the operating system B has no choice but to select a storage device configuration, causing it to install the driver software 34, then reset the device 4 and use it as a modem based on the newly installed driver software 34.

Note that because the modem 4 was obliged to enumerate the configurations earlier in the process at step S30, in such embodiments it may not have the option of now telling the second operating system B that it does not have config 2 available. This is the reason for instead defining config 2 as another storage configuration. However, if the interface specification allows, it would also be possible to hide or reduce the number of configurations advertised to the host 2.

Turning to the alternative branch of the process flow in FIG. 2, if on the other hand the modem device 4 does receive a query for the MBIM descriptor (or the like), then it knows the operating system 14 is of the type A that understands the relevant protocol. Only if it detects the right kind of operating system, in this case one of the first A, it responds at step S70 with descriptors one or more defining that config 2 is a modem and that the modem device supports the functionality whereby it can operate under the intrinsic modem software 34' of the first version A1 of the first operating system. It also responds defining config 1 as a storage device configuration. This means the operating system and the two configurations can function as originally designed.

At step S90 the host terminal 2 receives the definitions, comprising the indication of the functionality (e.g. comprising the MBIM descriptor). If it is running the second, legacy version A2, at step S100 the operating system 14 on the host 2 ignores the MBIM descriptor (or the like) and uses the storage device configuration config 1 to install the driver software 34 from the modem, then reset the device 4 and use it as a modem based on the newly installed driver software 34. If on the other hand the operating system 14 is the first, more up-to-date version A1, at step S110 it operates the modem without installing the driver software 34 by instead using its own intrinsic modem software 34'.

It will be appreciated that the above embodiments have been described only by way of example. E.g. the disclosure is not limited to USB or any particular specification, or to any particular operating system or combination of operating systems. The disclosure may apply in any situation where a support for a modem device by one operating system is not implemented in a second operating system, so that the two operating systems require different ways of operating the device as a modem. Other variants may be implemented by a person skilled in the art given the disclosure herein. The disclosure is not limited by the described embodiments but only by the accompanying claims.

The invention claimed is:

1. A device for use with at least a first version of a first operating system comprising intrinsic software for operating the device as a wireless modem, and at least one second operating system that requires installation of driver software to operate the device as a wireless modem; the device comprising:
   a wireless transceiver;
   an interface for connecting with a terminal running one of the first and second operating systems;
   memory storing the driver software for installation on the terminal if running the second operating system; and
   processing apparatus operable to output a first definition of a configuration of the device and a second definition of a configuration of the device; wherein the first definition defines configuration of the device as a storage device for providing the driver software to the terminal; and on condition that the terminal is running the first version of the first operating system, the second definition defines configuration of the device as a modem,
   wherein on condition that the terminal is running the second operating system, the second definition is set identical to the first definition.

2. The device of claim 1, wherein the processing apparatus is configured to output said definitions in response to a query from the operating system running on the terminal.

3. The device of claim 1, wherein the second definition comprises an indication that the device supports operation by the intrinsic software of the first version of the first operating system.

4. The device of claim 3, wherein the processing apparatus is configured to determine said condition in dependence on whether it receives a query for said indication from the terminal.

5. The device of claim 4, wherein if no query for said indication is received, the second definition defines configuration of the device as a storage device for providing the driver software for installation on the terminal.

6. The device of claim 3, wherein the first operating system is of a first software developer, and the second operating system is of a second software developer; and wherein said indication is of a proprietary protocol of the first software developer not recognized by the second operating system.

7. The device of claim 6, wherein:
   the processing apparatus is configured to output said definitions in response to a query from the operating system running on the terminal; and
   the processing apparatus is configured according to a specification which requires it to output the number of configurations available if requested by the operating system running on the terminal, such that if requested by the second operating system the device must indicate availability of the second configuration to the second operating system.

8. The device of claim 1, wherein the first operating system is of a first software developer, and the second operating system is of a second software developer.

9. The device of claim 1, wherein if the operating system running on the terminal is the second version of the first operating system the device operates according to the first definition.

10. The device of claim 1, wherein the wireless transceiver comprises a cellular transceiver, the device thereby enabling the terminal to communicate over a mobile cellular network when operated as a modem.

11. The device of claim 10, wherein the mobile cellular network comprises a 3GPP network and/or CDMA network.

12. The device of claim 10, wherein the device enables the terminal to perform one or both of call and packet-based communications over the mobile cellular network when operated as a modem.

13. The device of claim 10, wherein the device enables the terminal to access the Internet, virtual private network or other remote network via the mobile cellular network when operated as a modem.

14. The device of claim 1, in the form of an external device for plugging in to the terminal.

15. The device of claim 1, wherein the interface comprises one of a USB connector and a PCIe minicard connector.

16. The device of claim 1, wherein the terminal to which the interface is arranged to connect comprises a desktop or laptop computer.

17. The device of claim 1, wherein the device is also for use with a second version of the first operating system, the second version requiring installation of driver software to operate the device as a wireless modem, and the memory storing driver software for installation on the terminal if running the second version of the first operating system.

18. A device for use with at least a first version of a first operating system comprising intrinsic software for operating the device as a wireless modem, and at least one second operating system that requires installation of driver software to operate the device as a wireless modem; the device comprising:
   a wireless transceiver;
   an interface for connecting with a terminal running one of the first and second operating systems;
   memory storing the driver software for installation on the terminal if running the second operating system; and
   processing apparatus operable to output a first definition of a configuration of the device and a second definition of a configuration of the device; wherein the first definition defines configuration of the device as a storage device for providing the driver software to the terminal; and on condition that the terminal is running the first version of the first operating system, the second definition defines configuration of the device as a modem,
   wherein on condition that the terminal is running the second operating system, the second definition is set identical to the first definition to define configuration of the device as a storage device for providing the driver software to the terminal,
   wherein the second definition comprises an indication that the device supports operation by the intrinsic software of the first version of the first operating system, and
   wherein the device is also for use with a second version of the first operating system, the second version requiring installation of driver software to operate the device as a wireless modem, and the memory storing driver software for installation on the terminal if running the second version of the first operating system.

* * * * *